US010332120B2

(12) United States Patent
Niemoeller et al.

(10) Patent No.: US 10,332,120 B2
(45) Date of Patent: Jun. 25, 2019

(54) METHOD AND SCORE MANAGEMENT NODE FOR SUPPORTING SERVICE EVALUATION BASED ON CORRELATED SERVICE EVENTS

(71) Applicant: Telefonaktiebolaget L M Ericsson (publ), Stockholm (SE)

(72) Inventors: Joerg Niemoeller, Sundbyberg (SE); Lisa Sawin, Bridgewater, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 948 days.

(21) Appl. No.: 14/611,408

(22) Filed: Feb. 2, 2015

(65) Prior Publication Data

US 2016/0224986 A1    Aug. 4, 2016

(51) Int. Cl.
*G06Q 30/00* (2012.01)
*G06Q 30/02* (2012.01)

(52) U.S. Cl.
CPC ....... *G06Q 30/016* (2013.01); *G06Q 30/0201* (2013.01)

(58) Field of Classification Search
USPC ............................................... 705/7.11–7.42
See application file for complete search history.

(56) References Cited

U.S. PATENT DOCUMENTS

| 6,578,005 B1* | 6/2003 | Lesaint ................. G06Q 10/06 705/7.14 |
| 2006/0212359 A1* | 9/2006 | Hudgeon ............. G06Q 10/063 705/7.11 |
| 2008/0056144 A1* | 3/2008 | Hutchinson ............. H04L 43/00 370/250 |

OTHER PUBLICATIONS

Conner, et al., "A trusted management framework for Service-Oriented Environments", Track: Web Engineering/Session: Service Oriented Development, WWW 2009 Madrid!, pp. 891-900. (Year: 2009).*

* cited by examiner

*Primary Examiner* — Amber A Misiaszek
(74) *Attorney, Agent, or Firm* — Patent Portfolio Builders, PLLC (57) ABSTRACT

A method and a score management node for supporting service evaluation by obtaining a perception score reflecting a user's experience of one or more services delivered by a telecommunication network. The score management node receives a network measurement related to a current service event of service delivery to the user within a predefined time length from a previous service event, and determines a correlation level reflecting the user's perception of the current service event as correlated with the previous service event. A quality score is determined for the current service event, reflecting the user's perception of quality of service delivery and an associated significance reflecting the user's perception of importance of service delivery, based on the network measurement and the correlation level. The perception score is then calculated for the current service event as the quality score weighted by the associated significance and is made available for the service evaluation.

23 Claims, 5 Drawing Sheets

| Service type | <type 1> | <type 2> | <type 3> | <type 4> |
|---|---|---|---|---|
| Correlation Level | L_1 | L_2 | L_3 | L_4 |
| Level increase step | S_1 | S_2 | S_3 | S_4 |

Fig. 4

| Service type | <type 1> | <type 2> | <type 3> | <type 4> |
|---|---|---|---|---|
| <type 1> | $L_{1,1} = L_1$ | $L_{1,2} = \sqrt{L_1 L_2}$ | $L_{1,3} = \sqrt{L_1 L_3}$ | $L_{1,4} = \sqrt{L_1 L_4}$ |
| <type 2> | $L_{2,1} = \sqrt{L_2 L_1}$ | $L_{2,2} = L_2$ | $L_{2,3} = \sqrt{L_2 L_3}$ | $L_{2,4} = \sqrt{L_2 L_4}$ |
| <type 3> | $L_{3,1} = \sqrt{L_3 L_1}$ | $L_{3,2} = \sqrt{L_3 L_2}$ | $L_{3,3} = L_3$ | $L_{3,4} = \sqrt{L_3 L_4}$ |
| <type 4> | $L_{4,1} = \sqrt{L_4 L_1}$ | $L_{4,2} = \sqrt{L_4 L_2}$ | $L_{4,3} = \sqrt{L_4 L_3}$ | $L_{4,4} = L_4$ |

Fig. 5

| Service type | <type 1> | <type 2> | <type 3> | <type 4> |
|---|---|---|---|---|
| <type 1> | $C_{1,1}$ | $C_{1,2}$ | $C_{1,3}$ | $C_{1,4}$ |
| <type 2> | $C_{2,1}$ | $C_{2,2}$ | $C_{2,3}$ | $C_{2,4}$ |
| <type 3> | $C_{3,1}$ | $C_{3,2}$ | $C_{3,3}$ | $C_{3,4}$ |
| <type 4> | $C_{4,1}$ | $C_{4,2}$ | $C_{4,3}$ | $C_{4,4}$ |

Fig. 6a

| Service type | <type 1> | <type 2> | <type 3> | <type 4> |
|---|---|---|---|---|
| <type 1> | 1 | 0.9 | 0.2 | 0.2 |
| <type 2> | 0.9 | 1 | 0.8 | 0.2 |
| <type 3> | 0.2 | 0.8 | 1 | 0.5 |
| <type 4> | 0.2 | 0.2 | 0.5 | 1 |

Fig. 6b

| Service type | \<type 1\> | \<type 2\> | \<type 3\> | \<type 4\> |
|---|---|---|---|---|
| \<type 1\> | $L_{1,1} = C_{1,1} L_1$ | $L_{1,2} = C_{1,2}\sqrt{L_1 L_2}$ | $L_{1,3} = C_{1,3}\sqrt{L_1 L_3}$ | $L_{1,4} = C_{1,4}\sqrt{L_1 L_4}$ |
| \<type 2\> | $L_{2,1} = C_{2,1}\sqrt{L_2 L_1}$ | $L_{2,2} = C_{2,2} L_2$ | $L_{2,3} = C_{2,3}\sqrt{L_2 L_3}$ | $L_{2,4} = C_{2,4}\sqrt{L_2 L_4}$ |
| \<type 3\> | $L_{3,1} = C_{3,1}\sqrt{L_3 L_1}$ | $L_{3,2} = C_{3,2}\sqrt{L_3 L_2}$ | $L_{3,3} = C_{3,3} L_3$ | $L_{3,4} = C_{3,4}\sqrt{L_3 L_4}$ |
| \<type 4\> | $L_{4,1} = C_{4,1}\sqrt{L_4 L_1}$ | $L_{4,2} = C_{4,2}\sqrt{L_4 L_2}$ | $L_{4,3} = C_{4,3}\sqrt{L_4 L_3}$ | $L_{4,4} = C_{4,4} L_4$ |

METHOD AND SCORE MANAGEMENT NODE FOR SUPPORTING SERVICE EVALUATION BASED ON CORRELATED SERVICE EVENTS

TECHNICAL FIELD

The present disclosure relates generally to a method and a score management node for supporting service evaluation by obtaining a perception score P reflecting a user's experience of a service delivered by means of a telecommunication network.

BACKGROUND

When a service has been delivered by means of a telecommunication network by a service provider to one or more users, it is of interest for the service provider to know whether the user is satisfied with the delivered service or not, e.g. to find out if the service has shortcomings that need to be improved in some way to make it more attractive to this user and to other users. Service providers, e.g. network operators, are naturally interested in making their services as attractive as possible to users in order to increase sales, and a service may therefore be designed and developed so as to meet the users' demands and expectations as far as possible. It is therefore useful to gain knowledge about the users' opinion after service delivery in order to evaluate the service. The services discussed in this disclosure may, without limitation, be related to streaming of audio and visual content e.g. music and video, on-line games, web browsing, file downloads, voice and video calls, delivery of information e.g. in the form of files, images and notifications, and so forth, i.e. any service that can be delivered by means of a telecommunication network.

A normal way to obtain the users' opinion about a delivered service is to explicitly ask the customer, after delivery, to answer certain questions about the service in a survey or the like. For example, the service provider may send out or otherwise present an inquiry form, questionnaire or opinion poll to the customer with various questions related to user satisfaction of the service and its delivery. If several users respond to such a poll or questionnaire, the results can be used for evaluating the service, e.g. for finding improvements to make, provided that the responses are honest and that a significant number of users have answered. An example of using survey results for estimating the opinion of users is the so-called Net Promoter Score, NPS, which is calculated from answers to user surveys to indicate the users' collected opinions expressed in the survey answers.

However, it is often difficult to motivate a user to take the time and trouble to actually answer the questions and send a response back to the service provider. Users are often notoriously reluctant to provide their opinions on such matters, particularly in view of the vast amounts of information and questionnaires flooding users in the current modern society. One way to motivate the user is to reward him/her in some way when submitting a response, e.g. by giving some present or a discount either on the purchased services or when buying future services, and so forth.

Even so, it is a problem that surveys can in practice only be conducted for a limited number of users which may not be representative for all users of a service, and that the feedback cannot be obtained in "real-time", that is immediately after service delivery. A survey should not be sent to a user too frequently either. The obtained feedback may thus get out-of-date.

Further problems include that considerable efforts must be spent to distribute a survey to a significant but still limited number of users and to review and evaluate all answers coming in, sometimes with poor results due to low responsiveness. Furthermore, the user may provide opinions which are not really accurate or honest and some responses to surveys may even be misleading. For example, the user is often prone to forget how the service was actually perceived or experienced when it was delivered, even after a short while, once prompted to respond to a questionnaire. Human memory thus tends to change over time, and the response given may not necessarily reflect what the user really felt and thought at service delivery. The user may further provide the response very hastily and as simply as possible not caring much if it really reflects their true opinion. The opinion expressed may also be dependent on the user's current mood such that different opinions may be expressed at different occasions, making the response all the more erratic and unreliable.

Still another problem is that it can be quite difficult to trace an underlying reason why users have been dissatisfied with a particular service, so as to take actions to eliminate the fault and improve the service and/or the network used for its delivery. Tracing the reason for such dissatisfaction may require that any negative opinions given by users need to be correlated with certain operational specifics related to network performance, e.g. relating to where, when and how the service was delivered to these users. This kind of information is not generally available and analysis of the network performance must be done manually by looking into usage history and history of network issues. Much efforts and costs are thus required to enable tracing of such faults and shortcomings.

SUMMARY

It is an object of embodiments described herein to address at least some of the problems and issues outlined above. It is possible to achieve this object and others by using a method and a score management node as defined in the attached independent claims.

According to one aspect, a method is performed by a score management node for supporting service evaluation by obtaining a perception score P reflecting a user's experience of one or more services delivered by means of a telecommunication network. In this method the score management node receives a network measurement related to a current service event of service delivery to the user within a predefined time length from at least one previous service event of service delivery to the user. The score management node then determines a correlation level L reflecting the user's perception of the current service event as correlated with the at least one previous service event. The score management node also determines, for the current service event, a quality score Q reflecting the user's perception of quality of service delivery and an associated significance S reflecting the user's perception of importance of service delivery, based on the network measurement and the correlation level L. The score management node further calculates the perception score P for the current service event as the quality score Q weighted by the associated significance S, wherein the perception score P is made available for the service evaluation.

According to another aspect, a score management node is arranged to support service evaluation by obtaining a perception score P reflecting a user's experience of one or more services delivered by means of a telecommunication network. The score management node comprises a processor and a memory containing instructions executable by the processor, whereby the score management node is configured to:

receive a network measurement related to a current service event of service delivery to the user within a predefined time length from at least one previous service event of service delivery to the user, determine a correlation level L reflecting the user's perception of the current service event as correlated with the at least one previous service event, determine, for the current service event, a quality score Q reflecting the user's perception of quality of service delivery and an associated significance S reflecting the user's perception of importance of service delivery, based on the network measurement and the correlation level L, and calculate the perception score P for the current service event as the quality score Q weighted by the associated significance S, wherein the perception score P is made available for the service evaluation.

Thereby, the perception score P can be used in the service evaluation as an estimation of the users' opinion particularly since P is adapted to the correlation between the current and previous service events, and it is possible to obtain P automatically after every time a service is delivered to the user. Further, the perception score P is calculated from technical measurements in the network related to the service usage which are readily available for any user and it is thus not necessary to depend on the user to answer a survey or the like.

The above method and score management node may be configured and implemented according to different optional embodiments to accomplish further features and benefits, to be described below.

A computer program storage product is also provided comprising instructions which, when executed on at least one processor in the score management node, cause the at least one processor to carry out the method described above for the score management node.

BRIEF DESCRIPTION OF DRAWINGS

The solution will now be described in more detail by means of exemplary embodiments and with reference to the accompanying drawings, in which:

FIG. 6b is a table with example values of the predefined correction factors in FIG. 6a.

DETAILED DESCRIPTION

The embodiments described in this disclosure can be used for supporting evaluation of a service by obtaining an estimated user opinion about the service when it has been delivered to a user by means of a telecommunication network. The embodiments will be described in terms of functionality in a "score management node". Although the term score management node is used here, it could be substituted by the term "score management system" throughout this disclosure.

Briefly described, a perception score P is calculated that reflects the user's experience of the service, based on technical network measurements made for one or more events or occasions when the service was delivered to the user, hereafter referred to as "service events" for short, which measurements are received by the score management node. In particular, a correlation of a current event of service delivery to the user with any previous event(s) of service delivery to the user is taken into account when calculating the perception score P. For example, the network measurements may relate to the time needed to download data, the time from service request until delivery, call drop rate, data rate and data error rate.

In this solution it has been recognized that if two or more service events occur within a limited time span the user can be expected to perceive these service events in combination such that a current service event is correlated with one or more previous service events, which can be taken into account in a manner to be described herein. Some examples of how this can be done will thus be described below. This solution may be used for obtaining a perception score P which has been adapted according to the correlation between service events.

In the following description, any network measurements related to delivery of a service to the user by means of a telecommunication network are generally denoted "v" regardless of measurement type and measuring method. It is assumed that such network measurements v are available in the network, e.g. as provided from various sensors, probes and counters at different nodes in the network, which sensors, probes and counters are already commonly used for other purposes in telecommunication networks of today, thus being operative to provide the network measurements v to the score management node for use in this solution. Key Performance Indicator, KPI, is a term often used in this field for parameters that in some way indicate network performance.

Further, the term "delivery of a service by means of a telecommunication network" may be interpreted broadly in the sense that it may also refer to any service delivery that can be recorded in the network by measurements that somehow reflect the user's experience of the service delivery. Some examples of services in this context have been mentioned above. Further examples include services provided by operator personal aided by an Operation and Support System, OSS, infrastructure. For example, "Point of sales" staff may be aided by various software tools for taking and executing orders from users. These tools may also be able to measure KPIs related to performance of the services. Another example is the Customer Care personal in call centers who are aided by some technical system that registers various user activities. Such technical systems may as well make network measurements related to these activities as input to the score management node.

For example, the network measurements v may be sent regularly from the network to the score management node, e.g. in a message using the hyper-text transfer protocol http or the file transfer protocol ftp over an IP (Internet Protocol) network. Otherwise the score management node may fetch the measurements v from a measurement storage where the network stores the measurements. In this disclosure, the term network measurement v may also refer to a KPI which is commonly prepared by the network to reflect actual physical measurements. The concept of KPIs is well-known as such in telecommunication networks.

The perception score P may be generated by the score management node as follows and with reference to FIG. 1 which illustrates a score management node 100 which receives network measurements v made in a telecommunication network 102 as related to service events when the service is delivered to the user. The network measurements v may be sent from the network 102 to the score management node 100 more or less in real-time in a "live stream" fashion as the service events occur, e.g. from an Operation & Maintenance, O&M, node or similar, not shown. Alternatively, the network measurements v may be recorded by the network 102 and stored in a suitable storage or database 104, as indicated by a dashed one-way arrow from the network 102, which information can be accessed by the score management node 100, e.g. at regular intervals, as indicated by a dashed two-way arrow. In this case the time when each network measurement has occurred may also be recorded which can be useful for the present solution when taking the correlation of service events into account.

The received network measurements v can be seen as "raw data" being used as input in this procedure. For example, the above O&M node may be an aggregation point or node for distributed sensors and probes that make measurements in the traffic flows throughout the network. This node may combine, correlate and potentially filter the measurement data, e.g. to produce KPIs or the like.

A quality score Q reflecting the user's perception of quality of a delivered service and an associated significance S reflecting the user's perception of importance of the delivered service, are determined for each service event by one or more "scoring modules" 100a, based on the received network measurements v. Q and S may be determined for each service event by applying predefined functions on each received network measurement, which will be explained in more detail later below. The perception score P is calculated by a "concluding scoring module" 100b from quality scores Q of multiple service events which are weighted by their associated significances S. Basically, the greater significance S the greater influence has the associated quality score Q on the resulting perception score P.

In this solution, the perception score P is determined for a current service event that occurs within a predefined time length from at least one previous service event of service delivery to the user, by taking into consideration a correlation between the current service event and the previous service event(s). This may be done so that the significance of a service event is increased if it occurs shortly, i.e. within the predefined time length, after another previous service event assuming that the user is inclined to put more significance to two or more service events occurring within the predefined time length, as compared to if they would occur one by one more separated in time. As indicated above, this solution takes into account that the user tends to remember two or more correlated service events together when they occur within the predefined time length, and the correlation of service events is thus a factor that will influence the resulting perception score P so that the significance and impact of a current service event is increased if correlated with one or more other previous service events, which may be realized in different ways to be described herein.

For example, one scoring module 100a in the score management node 100 may determine "basic" values of Q and S by applying predefined functions on each network measurement, and S may be increased depending on the above correlation by an event correlation module 100c in the score management node 100. Modification of S is done depending on various parameters maintained in a suitable information storage 100d, to be described further below. The score management node 100 may comprise other scoring modules as well for adjusting Q and/or S depending on other influencing factors, as indicated by a dotted line, which is however outside the scope of this solution.

Having generated the resulting perception score P, the score management node 100 makes P available for evaluation of the service, e.g. by saving it in a suitable storage or sending it to a service evaluation system or center, schematically indicated by numeral 106. For example, P may be sent to the service evaluation system or storage 106 in an http message or an ftp message over an IP network.

The service evaluation system or storage 106 may comprise an SQL (Structured Query Language) database or any other suitable type of database.

There are several advantages of this solution as compared to conventional ways of obtaining a user's opinion about a service. First, the perception score P is a quite accurate estimation of the users' opinion of the service event since it takes the correlation of service events into account by increasing the impact of a current service event when correlated with at least one previous recent service event, and it is possible to obtain P automatically and continuously in real-time for any user, basically after every time a service is delivered to a user. There are thus no restrictions regarding the number of users nor the extension of time which makes it possible to obtain a quite representative perception score P that is adapted to account for correlation between service events.

Second, the perception score P is calculated from technical measurements in the network related to the service usage which are truthful and "objective" as such, also being readily available, thereby avoiding any dependency on the user's memory and willingness to answer a survey or the like. Third, it is not necessary to spend time and efforts to distribute surveys and to collect and evaluate responses, which may require at least a certain amount of manual work.

Fourth, it is also possible to gain further knowledge about the service by determining the perception score P selectively, e.g. for specific types of services, specific types of network measurements, specific users or categories of users, and so forth. Fifth, it is also possible to trace a technical issue that may have caused a "bad" experience of a delivered service by identifying which measurement(s) have generated a low perception score P. It can thus be determined when and how a service was delivered to a presumably dissatisfied user, as indicated by the perception score P, and therefore a likely technical shortcoming that has caused the user's dissatisfaction can also be more easily identified. Once found, the technical issue can be eliminated or repaired. Different needs for improvement of services can also be prioritized based on the knowledge obtained by the perception score P. Further features and advantages will be evident in the description of embodiments that follows.

Figure 2:
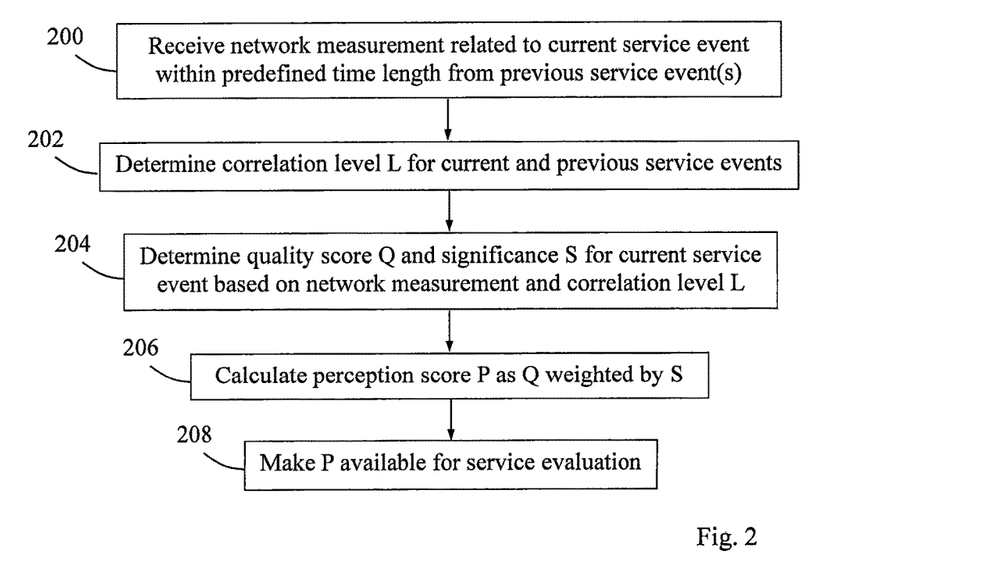
FIG. 2 is a flow chart illustrating a procedure in a score management node, according to further possible embodiments.

An example of how the solution may be employed will now be described with reference to the flow chart in FIG. 2 which illustrates a procedure with actions performed by a score management node, to accomplish the functionality described above. The score management node is operative to support service evaluation by obtaining a perception score P reflecting a user's experience of a service delivered by means of a telecommunication network, e.g. in the manner described above for the score management node 100.

In this procedure it is assumed that at least one previous service event of service delivery to the user has already occurred. In particular, this procedure produces a perception score P that is adapted to a correlation between a current service event and the at least one previous service event of service delivery to the user. It can thus be assumed that the user is likely to put higher significance to a current service event if it occurs shortly, i.e. within a predefined time length, after a previous service event that is correlated with the current one as compared to when no correlated previous service event has occurred recently. This is because the user is assumed to still remember the previous event when the current event occurs and will therefore be inclined to judge both service events "together" in some sense, and this fact is assumed to increase the significance of the current service event due to the correlation of the service events.

A first action 200 illustrates that the score management node receives a network measurement related to a service event when the service is delivered to the user. Basically, a network measurement is received each time the service is delivered to the user. This operation may be performed in different ways, e.g. when the network sends a stream of network measurements as they are generated, or by fetching network measurements from a measurement storage, as described above. Action 200 may thus be executed continuously or regularly any time during the course of this process of the following actions. The protocol used in this communication may be the hyper-text transfer protocol http or the file transfer protocol ftp, and the network measurements may be received in a message such as a regular http message or ftp message.

In some possible embodiments, the score management node may thus receive the network measurement of action 200 in a message according to the hyper-text transfer protocol http or the file transfer protocol ftp. In some further possible but non-limiting embodiments, the network measurement may be related to any of: the time needed to download data, the time from service request until delivery, call drop rate, data rate, and data error rate.

In a next action 202, the score management node determines a correlation level L reflecting the user's perception of the current service event as correlated with the at least one previous service event. The correlation level L may be predefined as such if the current and previous service events are of the same type. Otherwise, if the current and previous service events are of different types having separate predefined correlation levels, L may be determined as an average of these predefined correlation levels, which will be described in more detail later below.

In a next action 204, the score management node determines, for the current service event, a quality score Q reflecting the user's perception of quality of service delivery and an associated significance S reflecting the user's perception of importance of service delivery, based on the network measurement and the correlation level L. This may be done as follows. It was mentioned above that basic values of Q and S may first be determined by applying predefined functions on each respective network measurement v. For example, Q may be determined by applying a first predefined function Q(v) on the network measurement v, and S may be determined by applying a second predefined function S(v) on the network measurement v. The first and second functions are thus different functions configured to produce suitable values of Q and S, respectively.

Further, the first and second predefined functions Q(v) and S(v) are dependent on a type of the network measurement so that a function applied on, say, measurement of data rate is different from a function applied on measurement of call drop rate, to mention two non-limiting but illustrative examples. In this way, a pair of Q and associated S is obtained for each network measurement of a service event. In this solution, the basic value of the significance S is modified depending on the correlation level L of action 202. It was also mentioned above that the impact of the current service event on the perception score P may be increased according to the above correlation by increasing the value of S depending on the correlation level L determined in action 202. This may be done in accordance with different possible embodiments, to be described later below.

In a next action 206, the score management node calculates the perception score P for the current service event as the quality score Q weighted by the associated significance S. Finally, the calculated perception score P is made available for use in the service evaluation, as illustrated by an action 208, e.g. by saving it in a suitable storage or sending it to a service evaluation system or center, as also indicated by numeral 106 in FIG. 1. The protocol used in this communication may be e.g. the hyper-text transfer protocol http or the file transfer protocol ftp, and the perception score P may be sent to the service evaluation system or storage in an http message or an ftp message over an IP network. The service evaluation system or storage may comprise an SQL (Structured Query Language) database or any other suitable type of database.

The above-described actions 200-208 may be performed according to various embodiments as follows. In a possible embodiment, the score management node may reduce the correlation level L over time by predefined steps at regular intervals after the current service event, to reflect the user's fading memory of the current and previous service events together. Even though the user is expected to put increased significance to a service event if it occurs soon after another previous correlated service event, he/she can also be assumed to forget about the correlation of those service events, i.e. that they have happened together in some sense. The user may still remember each service event separately for a longer time but the combination of those service events together will be forgotten sooner so that after a while each of the once correlated service events stays in the user's memory alone but not combined.

Figure 3:
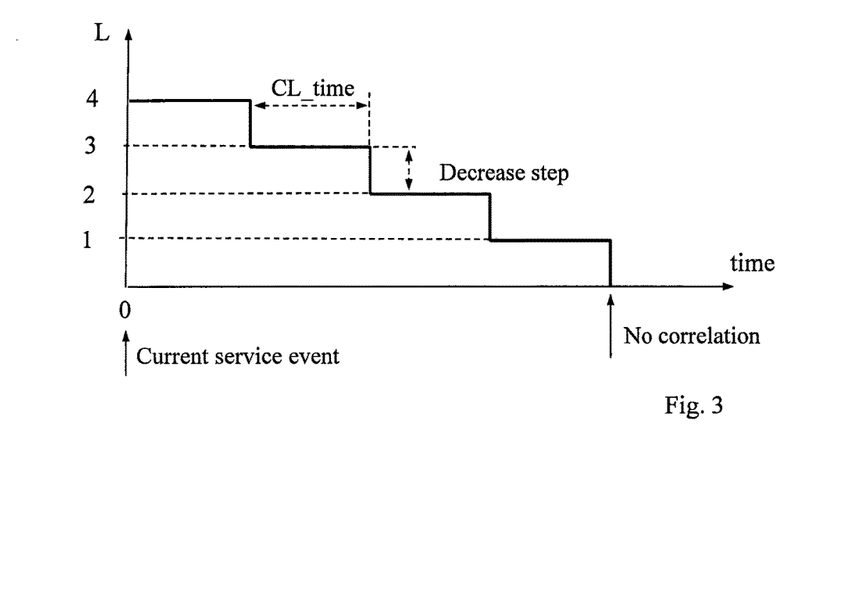
FIG. 3 is a diagram illustrating an example of how a time-dependent correlation level L may be reduced stepwise over time after two or more correlated service events, according to further possible embodiments.

An example of this embodiment is illustrated by the diagram of FIG. 3 where a current service event, for which a basic significance S is determined, occurs within the predefined time length. This diagram illustrates that the correlation level L is initially determined to be 4, i.e. at time 0 when the current service event occurs, and that the correlation level L is decreased at regular intervals indicated as "CL_time" by a certain amount indicated as "Decrease step". I this example, L is decreased four times by 1 and L finally reaches zero at "no correlation" which is when it can be assumed that the user has virtually forgotten about the service events in combination, or at least he/she puts no significance to it.

Figure 4:
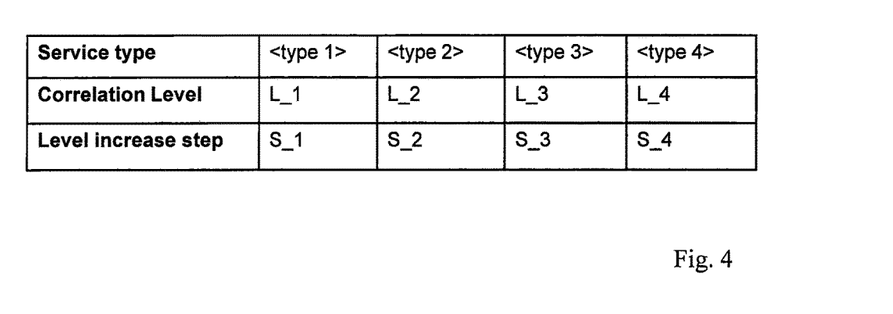
FIG. 4 is a table illustrating some examples of correlation level and how they can be increased by predefined steps for each new service event, according to further possible embodiments.

In another possible embodiment, the score management node may increase the correlation level L each time a network measurement related to a new service event of service delivery to the user is received within the predefined time length from the previous service event(s). FIG. 4 is a table that the score management node may employ to determine and increase the correlation level if more than one service event occurs within the predefined time length. This table comprises some schematic examples of correlation levels L_1-L_4 for different service types 1-4 and of how L can be increased by predefined steps S_1-S_4 for each new service event that occurs within the predefined time length. Hence, even if L of each individual service event is decreased over time according to the forgoing embodiment, the overall correlation level L will rise each time a new service event occurs that is correlated with any previous recent ones, according to the present embodiment.

It was mentioned above that the correlation level L may be determined in different ways depending on whether the current and previous service events are of the same or different types. In one possible embodiment, when the current and previous service events are of the same service type n, the score management node may determine the correlation level L as a predefined correlation level $L_n$ of the service type n, which the score management node may retrieve from a suitable information storage, e.g. as indicated by numeral 100d in FIG. 1. On the other hand, when the current and previous service events are of different service types n and m, the score management node may in another possible embodiment determine the correlation level L as a combined correlation level $L_{m,n}$ based on a predefined correlation level $L_n$ of the service type n of the current service event and a predefined correlation level $L_m$ of the service type m of the previous service event(s) such that $$L_{m,n} = \sqrt{L_m L_n}$$

Figure 5:
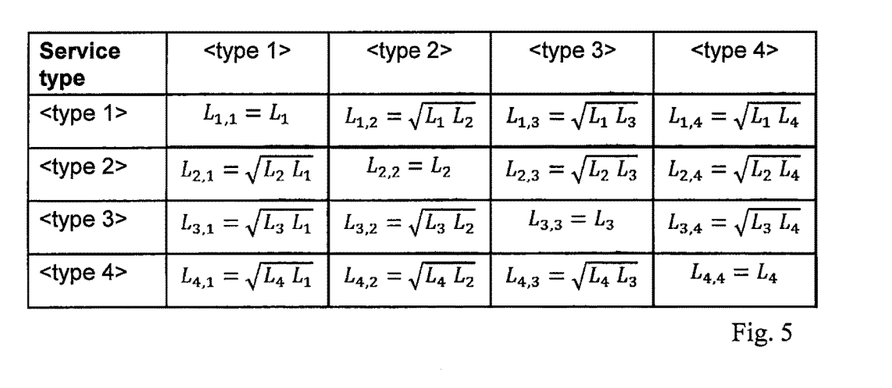
FIG. 5 is a table illustrating a matrix with some examples of how a combined correlation level can be determined to indicate correlation between different combinations of two service events, according to further possible embodiments.

Some examples of the latter two embodiments are shown in the table of FIG. 5 which is basically a matrix with combined correlation levels which indicate correlation between different combinations of two service events according to the above formula. It can be noted that for two service events of the same service type the correlation level $L_{n,n}$ is $L_n$ according to the above formula, see also the diagonal from top left to bottom right in FIG. 5, which corresponds to the forgoing embodiment.

In another possible embodiment, when a combined correlation level $L_{m,n}$ is determined for different service types m and n, the score management node may adjust the combined correlation level $L_{m,n}$ by multiplying a predefined correlation factor $C_{m,n}$ reflecting a strength of the correlation between the different service types n and m, such that the adjusted combined correlation level $L'_{m,n}$ is $$L'_{m,n} = L_{m,n} \times C_{m,n}$$

Figure 1:
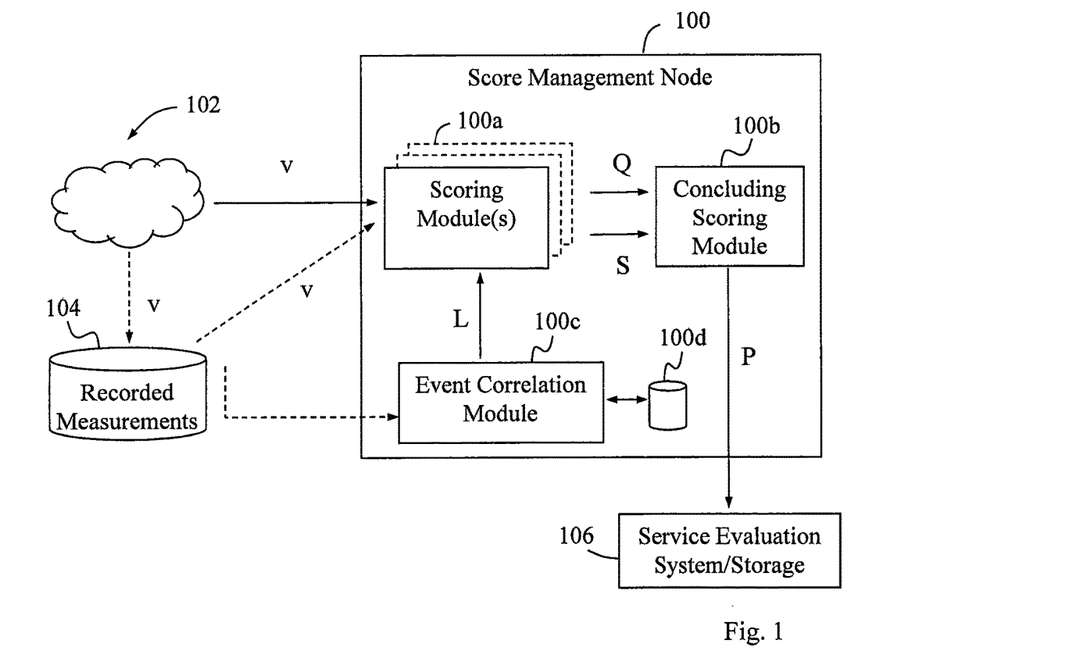
FIG. 1 is a block diagram illustrating an example of how a score management node may be configured and operable, according to some possible embodiments.
Figure 6A:
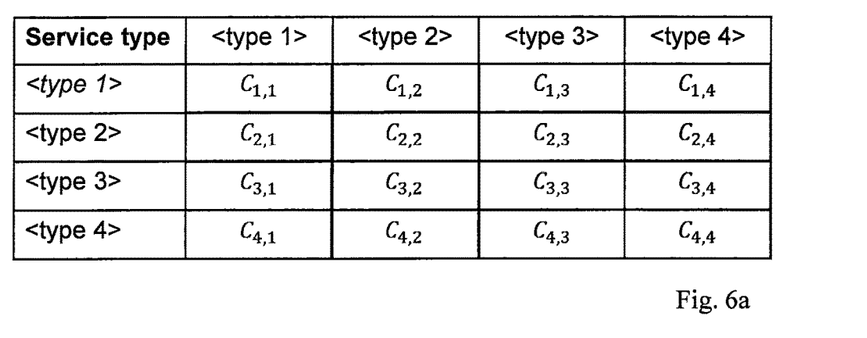
FIG. 6a is a table with predefined correction factors for different combinations of service types, according to further possible embodiments.
Figure 6B:
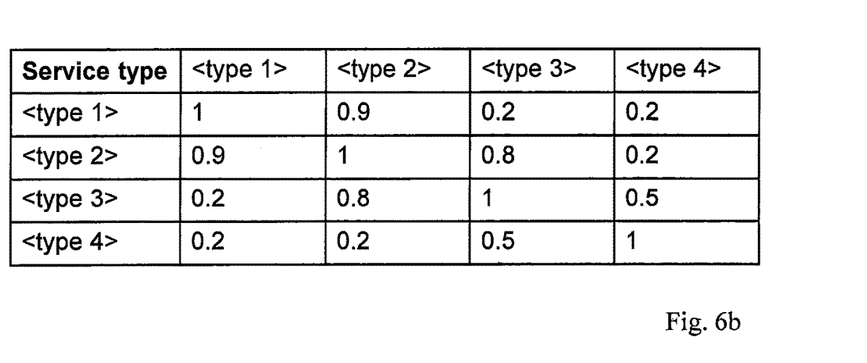

Some examples of predefined correlation factors $C_{m,n}$ for different pairs of service types m and n are shown in the table of FIG. 6a which may be maintained and retrieved from an information storage in the score management node such as storage 100d in FIG. 1. FIG. 6b further illustrates a table with example values of the predefined correction factors in FIG. 6a. It can be noted that for event combinations of the same service type n, $C_{n,n}$ is 1 according to the diagonal in FIG. 6b, and for any event combinations of different service types n and m, $C_{m,n}$ is less than 1. As a result, the combined correlation level $L_{n,n}$ for two service events of the same type remains unreduced by multiplying $C_{n,n}=1$, while the combined correlation level $L_{m,n}$ for two service events of different service types n and m is reduced by multiplying $C_{m,n}<1$.

Figure 7:
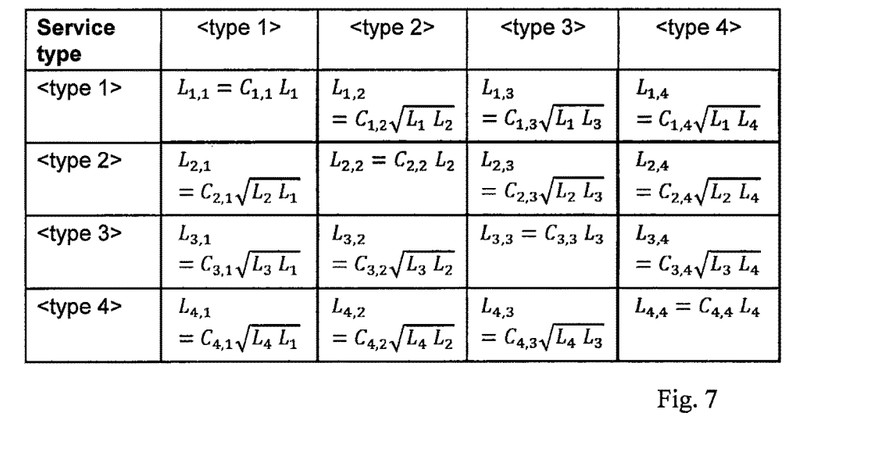
FIG. 7 is a table illustrating a matrix with some examples of how the combined correlation levels in FIG. 5 can be adjusted by the predefined correction factors in FIG. 6a, according to further possible embodiments.

The above further implies that two service events of the same service type have a stronger correlation, i.e. higher value of L, than two service events of different service types which has a lower reduced value of L. Furthermore, the correlation between different service types may be more or less strong which is reflected in the table of FIG. 6b. For example, the correlation factor $C_{1,2}$ for a combination of types 1 and 2 is 0.9 which is stronger than the correlation factor $C_{1,4}$ for a combination of types 1 and 4 being only 0.2. FIG. 7 is a table illustrating a matrix with examples of combined correlation levels that result from using the tables of FIGS. 5 and 6a, i.e. when the combined correlation levels in FIG. 5 are adjusted by the predefined correction factors in FIG. 6a.

In yet another embodiment, the score management node may determine an influence factor F based on a predefined "factor function" f(L) of the correlation level L, and determines the significance S by applying a predefined function S(v) on the network measurement v received for the current service event. In this embodiment the score management node then modifies the significance S by multiplying the influence factor F such that the modified significance S' is $$S' = S \times F$$

Figure 8:
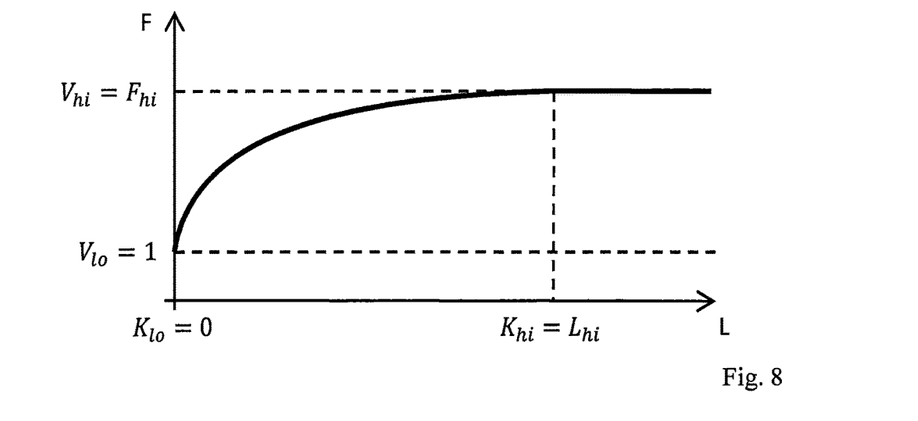
FIG. 8 is a diagram illustrating an example of how an influence factor F for modifying significance S of a service event, can be dependent on the correlation level L, according to further possible embodiments.

An example of such a factor function f(L) is shown in FIG. 8 which thus illustrates how an influence factor F for modifying significance S of a service event, may be dependent on the correlation level L. Thereby, L determined in action 202 is translated into an F value by the factor function f(L) and this F value is used for modifying S as described above to become adapted to the correlation of the current and previous service events. It was described above with reference to the table in FIG. 4 that the correlation level L is dependent on the number of correlated service events, as indicated by the Level increase steps in the table. The function f(L) in FIG. 8 shows that the influence factor F will increase greatly in the beginning by the first few added correlated service events but F increases less by adding further correlated service events, which reflects that the user is assumed to put more significance to the first additional events than to the latter ones. It can further be noted that for L=0, i.e. no correlation at all, F takes a minimum value $V_{lo}=1$ which means that S'=S, i.e. unchanged. F then increases above 1 with increased L until F reaches a maximum value $V_{hi}=F_{hi}$ which means that the correlation will increase S accordingly by a maximum amount.

The correlation level L may further be determined for any number of service events occurring within the predefined time length as follows. In yet another embodiment, when M service events of service delivery to the user have occurred within the predefined time length, the score management node may determine an overall correlation level L for the M service events as an average of correlation levels $L_{m,n}$ of the current service event n and each previous service event m as $$L = \frac{\sum_{m=1}^{M} L_{m,n}}{M}$$

In yet another embodiment, the score management node may determine multiple pairs of the quality score Q and associated significance S based on network measurements related to multiple service events of service delivery to the user, and then calculates the perception score P as an average of the quality scores Q weighted by their associated significances S. This can be done according to a further possible embodiment, where the score management node calculates the perception score $P_N$ for N network measurements as $$P_N = \frac{\sum_{n=1}^{N} Q_n S_n}{\sum_{n=1}^{N} S_n}$$

where $Q_n$ is the quality score for each network measurement n and $S_n$ is the associated significance for said network measurement n.

Figure 9:
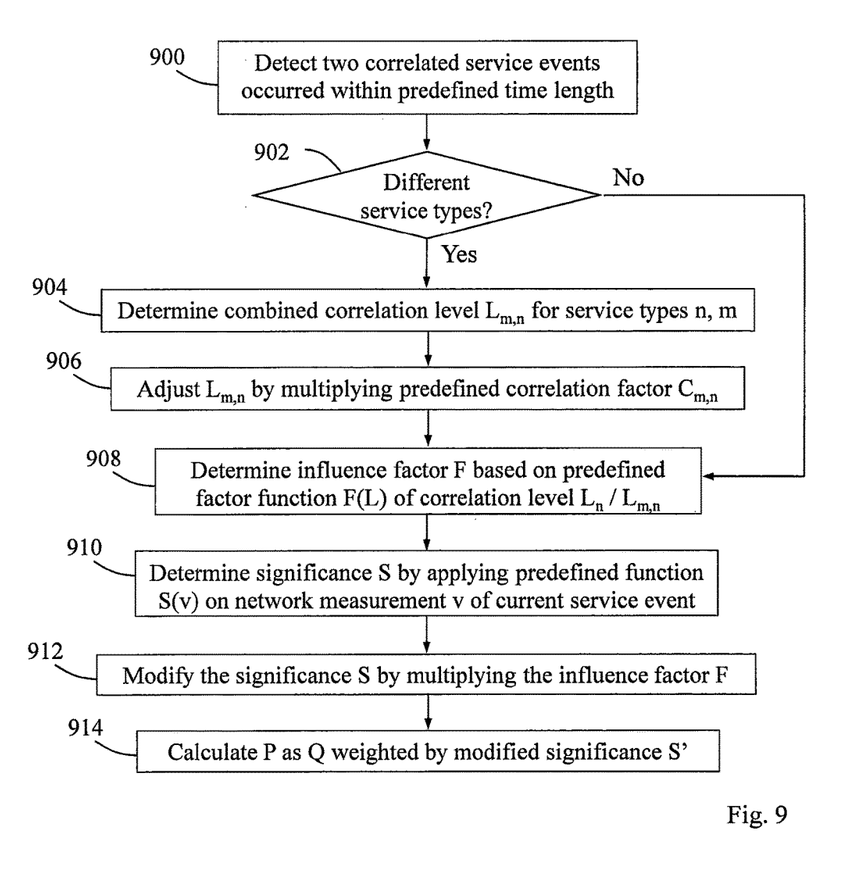
FIG. 9 is a flow chart illustrating an example of a more detailed procedure in a score management node, according to further possible embodiments.

A more detailed example of a procedure performed by a score management node, e.g. the score management node 100 of FIG. 1, for determining the perception score will now be described with reference to the flow chart in FIG. 9. In this example, several of the above-described embodiments are employed as follows. In a first action 900, the score management node detects that two correlated service events has occurred within the predefined time length including a current service event and a previous service event, to follow the terminology used elsewhere in this disclosure. It should be noted that this example is limited to two service events although it can be applied to any number of correlated service events occurring within the predefined time length. It is assumed that the score management node also receives a network measurement v for the latest, i.e. current, service event, although not shown here.

The score management node then determines whether the two correlated service events are different service types or the same service type, as illustrated by a following action 902. If they are different service types n and m, the score management node determines a combined correlation level $L_{m,n}$ for the service types in an action 904. This action may be performed by determining the combined correlation level $L_{m,n}$ based on a predefined correlation level $L_n$ of the service type n and a predefined correlation level $L_m$ of the service type m, e.g. in the manner described above with reference to FIG. 5.

The score management node then adjusts the combined correlation level $L_{m,n}$ in an action 906 by multiplying a predefined correlation factor $C_{m,n}$, e.g. in the manner described above with reference to FIGS. 6a, 6b and 7. The correlation factor $C_{m,n}$, thus indicates how strong the correlation is between service types n and m. If it is found in action 902 that the service events are the same type, actions 904 and 906 can be omitted since the correlation has a maximum of $C_{n,n}=1$, e.g. according to FIG. 6b, for service events of the same type n and a predefined correlation level $L_n$ of that service type n can be used directly in the following actions, without adjustment.

In either case, the score management node determines, in a further action 908, an influence factor F based on a predefined factor function f(L) of the correlation level L which is thus either the combined correlation level $L_{m,n}$ determined in action 904 and adjusted in action 906, or the actual predefined correlation level $L_n$ of the common service type n, depending on the outcome of action 902. The score management node also determines a "basic value" of the significance S by applying another predefined function S(v) on the network measurement v of the current service event, in another action 910.

A next action 912 illustrates that the score management node further modifies the significance S by multiplying it with the influence factor F determined in action 908. Thereby, the significance S has been adapted to the correlation between the two service events which reflects the user's ability to judge the two service events together since they have occurred within the predefined time length. The strength of this correlation is dependent on the correlation level L and also on the predefined correlation factor C in case the two service events are different service types. The above-described quality score Q is also determined for the current service event by applying another predefined function Q(v) on the network measurement v, although not shown here. The score management node finally calculates the perception score P as Q weighted by the modified significance S', in a further action 914, which may be performed in the manner described for action 206 above.

Figure 10:
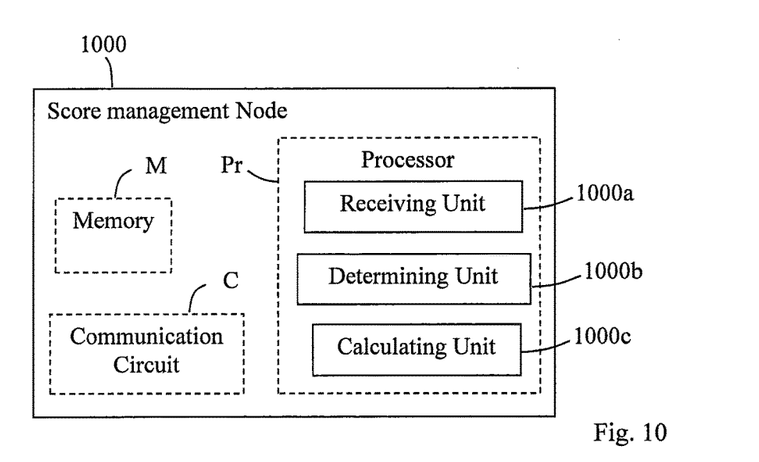
FIG. 10 is a block diagram illustrating a score management node in more detail, according to further possible embodiments.

The block diagram in FIG. 10 illustrates another detailed but non-limiting example of how a score management node 1000 may be structured to bring about the above-described solution and embodiments thereof. In this figure, the score management node 1000 may thus be configured to operate according to any of the examples and embodiments of employing the solution as described above, where appropriate, and as follows. The score management node 1000 in this example is shown in a configuration that comprises a processor "Pr", a memory "M" and a communication circuit "C" with suitable equipment for receiving and transmitting information and data in the manner described herein.

The communication circuit C in the score management node 1000 thus comprises equipment configured for communication with a telecommunication network, not shown, using one or more suitable communication protocols such as http or ftp, depending on implementation. As in the examples discussed above, the score management node 1000 may be configured or arranged to perform at least the actions of the flow charts illustrated in FIG. 2 and FIG. 9 in the manner described above. These actions may be performed by means of functional units in the processor Pr in the score management node 1000 as follows.

The score management node 1000 is arranged to support service evaluation based on a perception score P reflecting a user's experience of one or more services delivered by means of a telecommunication network. The score management node 1000 thus comprises the processor Pr and the memory M, said memory comprising instructions executable by said processor, whereby the score management node 1000 is operable as follows.

The score management node 1000 is configured to receive a network measurement related to a current service event of service delivery to the user within a predefined time length from at least one previous service event of service delivery to the user. This receiving operation may be performed by a receiving unit 1000*a* in the score management node 1000, e.g. in the manner described for action 200 above. The score management node 1000 is also configured to determine a correlation level L reflecting the user's perception of the current service event as correlated with the at least one previous service event. This first determining operation may be performed by a determining unit 1000*b* in the score management node 1000, e.g. in the manner described for action 202 above.

The score management node 1000 is further configured to determine, for the current service event, a quality score Q reflecting the user's perception of quality of service delivery and an associated significance S reflecting the user's perception of importance of service delivery, based on the network measurement and the correlation level L. This second determining operation may be performed by the determining unit 1000*b*, e.g. in the manner described for action 204 above. The score management node 1000 is further configured to calculate the perception score P for the current service event as the quality score Q weighted by the associated significance S, wherein the perception score P is made available for the service evaluation. This calculating operation may be performed by a calculating unit 1000*c* in the score management node 1000, e.g. in the manner described for action 206 above.

It should be noted that FIG. 10 illustrates some possible functional units in the score management node 1000 and the skilled person is able to implement these functional units in practice using suitable software and hardware. Thus, the solution is generally not limited to the shown structure of the score management node 1000, and the functional units 1000*a-c* may be configured to operate according to any of the features described in this disclosure, where appropriate.

The embodiments and features described herein may thus be implemented in a computer program storage product comprising instructions which, when executed on at least one processor, cause the at least one processor to carry out the above actions and functions e.g. as described for any of FIGS. 1-9. Some examples of how the computer program storage product can be realized in practice are outlined below, and with further reference to FIG. 10.

The processor Pr may comprise a single Central Processing Unit (CPU), or could comprise two or more processing units. For example, the processor Pr may include a general purpose microprocessor, an instruction set processor and/or related chips sets and/or a special purpose microprocessor such as an Application Specific Integrated Circuit (ASIC). The processor Pr may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the score management node 1000.

While the solution has been described with reference to specific exemplifying embodiments, the description is generally only intended to illustrate the inventive concept and should not be taken as limiting the scope of the solution. For example, the terms "score management node", "scoring module", "perception score", "quality score", "significance", "service event", "correlation level", "influence factor" and "correlation factor" have been used throughout this disclosure, although any other corresponding entities, functions, and/or parameters could also be used having the features and characteristics described here. The solution is defined by the appended claims.

The invention claimed is:

1. A method for tracing at least one technical issue to support service evaluation of one or more services by obtaining a perception score P reflecting a user's experience of the one or more services delivered by means of a telecommunication network, the method performed by a score management node, the score management node comprising a processor and a memory containing instructions executable by the processor, the method comprising:
   receiving one or more network measurements related to a current service event of service delivery to the user within a predefined time length from at least one previous service event of service delivery to the user;
   determining a correlation level L reflecting the user's perception of the current service event as correlated with the at least one previous service event;
   determining, for the current service event, a quality score Q reflecting the user's perception of quality of service delivery and an associated significance S reflecting the user's perception of importance of service delivery, based on the one or more network measurements and the correlation level L;
   calculating the perception score P for the current service event as the quality score Q weighted by the associated significance S, wherein the perception score P is made available for the service evaluation,
   and wherein the score management node calculates a perception score $P_N$ for N network measurements as $$P_N = \frac{\sum_{n=1}^{N} Q_n S_n}{\sum_{n=1}^{N} S_n},$$

where $Q_n$ is a quality score for each network measurement n and $S_n$ is an associated significance for said network measurement n; and
   determining the at least one technical issue, based on the calculated perception score P, in the one or more network measurements associated with the current service event, wherein determining the at least one technical issue facilitates in improving the one or more services by one of eliminating and repairing the at least one technical issue for the one or more services.

2. The method according to claim 1, wherein the score management node reduces the correlation level L over time by predefined steps at regular intervals after the current service event to reflect the user's fading memory of the current and previous service events together.

3. The method according to claim 1, wherein the score management node increases the correlation level L each time a network measurement related to a new service event of service delivery to the user is received within the predefined time length from the at least one previous service event.

4. The method according to claim 1, wherein the current and previous service events are of the same service type n, and wherein the score management node determines the correlation level L as a predefined correlation level $L_n$ of the service type n.

5. The method according to claim 1, wherein the current and previous service events are of different service types n and m, respectively, and wherein the score management node determines the correlation level L as a combined correlation level $L_{m,n}$ based on a predefined correlation level $L_n$ of the service type n of the current service event and a predefined correlation level $L_m$ of the service type m of the at least one previous service event such that $$L_{m,n} = \sqrt{L_m L_n}.$$

6. The method according to claim 5, wherein the score management node adjusts the combined correlation level $L_{m,n}$ by multiplying a predefined correlation factor $C_{m,n}$ reflecting a strength of the correlation between the different service types n and m, such that the adjusted combined correlation level $L'_{m,n}$ is $$L'_{m,n} = L_{m,n} \times C_{m,n}.$$

7. The method according to claim 1, wherein the score management node determines an influence factor F based on a predefined factor function f(L) of the correlation level L, determines the significance S by applying a predefined function S(v) on a network measurement v, and modifies the significance S by multiplying the influence factor F such that the modified significance S' is $$S' = S \times F.$$

8. The method according to claim 1, wherein M service events of service delivery to the user have occurred within the predefined time length, and wherein the score management node determines an overall correlation level for the M service events as an average of correlation levels $L_{m,n}$ of the current service event n and each previous service event m as $$L = \frac{\sum_{m=1}^{M} L_{m,n}}{M}.$$

9. The method according to claim 1, wherein the score management node determines multiple pairs of the quality score Q and associated significance S based on network measurements related to multiple service events of service delivery to the user, and calculates the perception score P as an average of the quality scores Q weighted by their associated significances S.

10. The method according to claim 1, wherein the one or more network measurements are related to at least one of: a time needed to download data, a time from a service request until delivery, a call drop rate, a data rate, or a data error rate.

11. The method according to claim 1, wherein the score management node receives the one or more network measurements in a message according to a hyper-text transfer protocol (HTTP) or a file transfer protocol (FTP).

12. A score management node arranged to trace at least one technical issue for supporting service evaluation of one or more services by obtaining a perception score P reflecting a user's experience of the one or more services delivered by means of a telecommunication network, the score management node comprising a processor and a memory containing instructions executable by the processor, wherein the score management node is configured to:
receive one or more network measurements related to a current service event of service delivery to the user within a predefined time length from at least one previous service event of service delivery to the user;
determine a correlation level L reflecting the user's perception of the current service event as correlated with the at least one previous service event;
determine, for the current service event, a quality score Q reflecting the user's perception of quality of service delivery and an associated significance S reflecting the user's perception of importance of service delivery, based on the one or more network measurements and the correlation level L;
calculate the perception score P for the current service event as the quality score Q weighted by the associated significance S, wherein the perception score P is made available for the service evaluation, and
wherein the score management node is configured to calculate a perception score $P_N$ for N network measurements as $$P_N = \frac{\sum_{n=1}^{N} Q_n S_n}{\sum_{n=1}^{N} S_n},$$

where $Q_n$ is a quality score for each network measurement n and $S_n$ is an associated significance for said network measurement n; and
determine the at least one technical issue, based on the calculated perception score P, in the one or more network measurements associated with the current service event, wherein the determined at least one technical issue facilitates in improvement of the one or more services by one of eliminating and repairing the at least one technical issue for the one or more services.

13. The score management node according to claim 12, wherein the score management node is configured to reduce the correlation level L over time by predefined steps at regular intervals after the current service event to reflect the user's fading memory of the current and previous service events together.

14. The score management node according to claim 12, wherein the score management node is configured to increase the correlation level L each time a network measurement related to a new service event of service delivery to the user is received within the predefined time length from the at least one previous service event.

15. The score management node according to claim 12, wherein the current and previous service events are of the same service type n, and the score management node is configured to determine the correlation level L as a predefined correlation level $L_n$ of the service type n.

16. The score management node according to claim 12, wherein the current and previous service events are of different service types n and m, respectively, and the score management node is configured to determine the correlation level L as a combined correlation level $L_{m,n}$ based on a predefined correlation level $L_n$ of the service type n of the current service event and a predefined correlation level $L_m$ of the service type m of the at least one previous service event such that $$L_{m,n} = \sqrt{L_m L_n}.$$

17. The score management node according to claim 16, wherein the score management node is configured to adjust the combined correlation level $L_{m,n}$ by multiplying a predefined correlation factor $C_{m,n}$ reflecting a strength of the correlation between the different service types n and m, such that the adjusted combined correlation level $L'_{m,n}$ is $$L'_{m,n} = L_{m,n} \times C_{m,n}.$$

18. The score management node according to claim 12, wherein the score management node is further configured to determine an influence factor F based on a predefined factor function f(L) of the correlation level L, determine the significance S by applying a predefined function S(v) on a network measurement v, and modify the significance S by multiplying the influence factor F such that the modified significance S' is $$S' = S \times F.$$

19. The score management node according to claim 12, wherein M service events of service delivery to the user have occurred within the predefined time length, and the score management node is configured to determine an overall correlation level for the M service events as an average of correlation levels $L_{m,n}$ of the current service event n and each previous service event m as $$L = \frac{\sum_{m=1}^{M} L_{m,n}}{M}.$$

20. The score management node according to claim 12, wherein the score management node is configured to determine multiple pairs of the quality score Q and associated significance S based on network measurements related to multiple service events of service delivery to the user, and to calculate the perception score P as an average of the quality scores Q weighted by their associated significances S.

21. The score management node according to claim 12, wherein the one or more network measurements are related to at least one of: a time needed to download data, a time from a service request until delivery, a call drop rate, a data rate, or a data error rate.

22. The score management node according to claim 12, wherein the score management node is configured to receive the one or more network measurements in a message according to a hyper-text transfer protocol (HTTP) or a file transfer protocol (FTP).

23. A computer program storage product comprising instructions which, when executed on at least one processor, cause the at least one processor to carry out the method according to any one of claims 1-9 and 10-11.

* * * * *